United States Patent Office 3,649,656
Patented Mar. 14, 1972

3,649,656
PROCESS OF IMPROVING THE QUALITY OF FATS OBTAINED DURING RENDERING OR REFINING
Ilona Taussky, 440 E. 79th St., New York, N.Y. 10021
No Drawing. Filed July 23, 1969, Ser. No. 844,159
Int. Cl. C11b 1/12
U.S. Cl. 260—412.7
12 Claims

ABSTRACT OF THE DISCLOSURE

During rendering or refining of freshly rendered fats, a combination of lignin and a calcium silicate, magnesium silicate or a mixture of these two silicates is added to the charge in an amount of at least 0.05% by weight of each of these additives relative to the weight of the anticipated or measured fat yield.

The combined additives improve the color and odor of the fat, reduce the free fatty acid contents and shorten the filtration time.

BACKGROUND OF THE INVENTION

The present invention relates to a process of improving the quality of fat obtained during rendering or refining of the fat.

In the rendering step where the animal byproducts as obtained from the slaughter house and similar sources are separated from the fat, the raw material is customarily processed in a cooker where it is subjected to the action of steam at a pressure, for instance, between 50 and 60 pounds per sq. in. for a period of time, such as 1–3 hours. This step is then followed by settling or centrifugating and various purification steps, in particular, a brine or trisodium phosphate wash.

Usually a number of operations were necessary to obtain a top quality fat.

The refining step has been simplified by applicant's Pat. No. 2,654,766 which discloses a method whereby the "fines," that is, the proteinaceous matter can be removed from freshly rendered fats and fatty acids of vegetable and animal origin, including marine oils, sperm oils, glyceride oils etc. by adding tot he fat liknin, preferably in its water soluble form, together with an alkaline material. The alkali is, for instance, sodium hydroxide and trisodium phosphate. In this process the neutralization of the fatty acid is accomplished by the alkali material, particularly the sodium hydroxide, and the lignin then improves the settling and filtration to permit removal of the impurities.

However, the same combination of materials could not be used in the initial rendering step since the sodium hydroxide would form a water-soluble soap in the cooker which could not easily be removed and would thus require special separation steps.

On the other hand the lignin, be it in water-soluble or dry form, could not be used alone during the rendering charge since it does not of itself affect the acidity of the material which must be brought down during the rendering operation.

It has also been proposed to use certain silicates, such as, calcium silicate or magnesium silicate during the refinement step in order to improve the color and free fatty acid control. However the silicates have a tendency to form fat-soluble silicate soaps. They could never be used as such in the cooker during rendering since they cause foaming. Also, the silicate soaps when in the cooker enter the fat phase and thus interfere with the subsequent clarification and settling of the fat by centrifuging or filtering and cause blocking up of the filter. Besides, comparatively large amounts of silicates are necessary to obtain the desired result.

It is therefore an object of the present invention to provide for an improved free fatty acid and color control both in the rendering and in the refinement step.

A further object of the invention is to provide a means to accomplish such control which does not require large amounts of additives or expensive additives and therefore does not materially increase the cost of the process.

An additional object of the invention is to permit a maximum reduction of the free fatty acid contents, improvement of the color and shortening of the filtration time in the filtration step, even beyond that obtainable by the combined use of lignin with alkali such as sodium hydroxide and trisodium phosphate.

SUMMARY OF THE INVENTION

These objects are accomplished by adding to the fat containing raw material during the rendering step or to the fat containing proteinaceous matter during refining, in combination, (a) lignin and
(b) calcium silicate, magnesium silicate or a mixture of these two silicates.

in amounts of at least 0.05% by weight of each of the additives at (a) and (b) relative to the weight of the anticipated yield of fat.

DESCRIPTION OF THE PREFERRED EMBODIMENTS

As stated the invention resides in the combined use of lignin and calcium or magnesium silicate or a mixture of the two silicates. It is based on the surprising finding that by the combination of these two additives an improvement in the quality of the fat, particularly a reduction of the free fatty acids (F.F.A.) contents, an improvement of the color and odor and a shortening of the filter time are accomplished which could not be attained by using only one or the other of these additives by itself.

Insofar as the refining step is concerned, the improvement also goes beyond that obtainable by the combination of lignin with alkali such as sodium hydroxide or trisodium phosphate.

In addition it has been found that this combination of additives, as distinguished from the combination of lignin with the mentioned alkaline compounds, can be used also in the fat rendering operation.

The silicates in these two types of operations, the fat rendering and the fat refining, neutralize the fatty acids and form a dry insoluble soap due to the presence of lignin which serves to demulsify the charge thus facilitating the filtration and separation.

While I do not want to be committed to any specific theory it is believed that the lignin acts as a nucleating, or perhaps catalytic, agent which combines with the protein and favors the formation of granular protein particles which are easier to separate by gavity, screening or centrifuging.

The lignin thus counters the otherwise noticed tendency of the silicates to cause foaming and to leave fat soluble soaps which enter the fat phase and resist centrifuging and/or filtration.

Without the use of the additives there may be as much as 1–2% protein locked in the settled, centrifugated or screened rendered fat phase, whereas with the additives proposed in the invention the fat phase when cooked retains as little as 0.1–0.2% after centrifuging or screening. This is important since fats with low contents of "insolubles" are easier to filter.

On the other hand, when used in combination with lignin, the silicates retain their property of free fatty acid reduction without creating separation problems and actually result in an improvement of the fat rendered although they are used in very low amounts only.

With the combined additives of the invention it is possible, already in the rendering step, to obtain an immediate and almost complete separation of the fat from the residue which contains the concentrated off-odors that carry into the fat phase and weaken the fat stability against oxidation. As a result the fats obtained from the cooker wherein the combined additives have been used are characterized by a milder odor, a lower acidity and a lower color index and absence of oxidation.

By adding the lignin-silicate combination in the modern automated fat cooking systems during the fine grinding stage, the uncooked raw stock also will be protected against "souring," that is, fermenting of the fat and causing odor problems and subsequent oxidation combined with increased acidity. Thus this undesirable phenomenon is arrested right at the commencement of the processing and the further refinement is thus either made unnecessary or considerably shortened and facilitated. The additives as indicated also reduce the odor release to the outside by locking in the odors, which is most important in connection with air pollution control.

If the combined additives are used during the refinement step a surprising and unexpected improvement of the free fatty acid reduction and color index as well as shortening of the filter time is obtained beyond that attainable by the combined use of lignin and, e.g., sodium hydroxide. It was unexpected that a replacement of the previously used alkaline compounds, sodium hydroxide or trisodium phosphate, by calcium silicate or magnesium silicate when combined with lignin would accomplish further improvements of the refinement results since the use of the silicates alone as indicated has rather undesirable side effects and does not do much to improve the economics of the operation because of the required comparatively large amounts of these additives.

A preferred combination of additives involves use of both silicates together. In that case the preferred total of both silicates is about 0.3% by weight. The amounts of the individual components, that is, the amount of each individual silicate and particularly the amount of lignin relative to the amount of silicates, can be varied within the ranges given. In other words, by using more of one component the amount of the other component may be reduced.

It appears that the minimum amount of both the silicates and the lignin, in order to accomplish a noticeable result, is 0.05% of each of the additives relative to the weight of the anticipated fat yield. Since both silicates as will presently be brought out accomplish somewhat different purposes, if both magnesium and calcium silicate are employed, the minimum level should still be 0.05% for each of the two silicates.

There is no definite upper limit of amounts. However, for cost reasons and because of decreasing efficiency, it is desirable not to go beyond 0.30% of each of the two or, if present, three components.

Calcium silicate as a material with a high pH is preferred where the acidity is the principal point to be considered in the refinement. Magnesium silicate, since lower in pH, is more effective in respect to color improvement.

The selective choice between calcium silicate and magnesium silicate, depending on whether acidity reduction or color improvement is the primary objective, thus permits steering the results in a desired direction.

If all three components, calcium silicate, magnesium silicate and lignin are used together, a combined, highly desirable effect occurs. The calcium silicate preferentially effects reduction of acidity, the magnesium silicate preferentially lowers the fat color index, and the lignin promotes the sharp separation of the fat phase from the proteinaceous residue which latter contains the complexes formed by the addition of silicates. The separation can then be carried out, after the rendering step, by gravity settling, filtration or centrifuging or screening as desired.

The lignin should be a purified sulfur- and sugar-free grade, such as that sold under the trademark "Politol" S or NA. As indicated the lignin may be in dry water-insoluble form (Politol NA) or, preferably, in its water-soluble form (Politol S), in which case it is applied as an aqueous solution. The lignin may particularly be used in the form of a ligno-phosphate.

"Politol S" or the insoluble "Politol NA" are sold by the West Virginia Pulp and Paper Co. of North Charleston, S.C.

The calcium silicate preferably is used in the form of a calcium silicate produced by the hydrothermal reaction of diatomite and lime, such as the product sold under the trademark "Micro-Cel" T–49 or T–13 by the Johns-Manville Corp.

The magnesium silicate may likewise be produced by the hydrothermal reaction of diatomite and magnesia, such as sold by the Johns-Manville Corp. under the trade name "Celkate" T–21.

There is nothing specific, apart from the use of the combination of additives, in the fat rendering or fat refining process. Reference is made in this respect to the manual prepared by Procter and Gamble (1967) and entitled "Better Rendering." Regarding the refinement step reference is also made to applicant's earlier Patent No. 2,654,766.

The invention of the present case can be used both with the so-called dry rendering and wet rendering. In the latter case a steam pressure of between 50 and 60 pounds per square inch is applied to the charge for the necessary time which may, for instance, be 5 hours.

In the refining step the charge is heated with water to a temperature preferably of at least 60° C. For this step it is preferred to add a conventional diatomite filter aid, such as, for instance, one of the various "Celite" filter aids of the Johns-Manville Corp., like "Celite" 560, "Celite" 503 or "Celite" 545, all of which are diatomaceous silicas.

The following examples will further illustrate the invention.

The first example relates to a fat rendering operation carried out on industrial scale. The latter examples relate to the refinement stage and include comparative examples to bring out the extent of the improvements accomplished by the invention. A final group of examples relates to industrial refinement processes carried out on a large scale.

Example 1

This example illustrates the rendering of fat on an industrial scale.

Fatty tissues and bones comminuted by fine grinding were charged into a cooker with the addition of ligno-silicates containing equal amounts of lignin, calcium silicate and magnesium silicate. The total charge of raw material was 8000 pounds. The ligno-silicates were added in the grinding stage before the charging was complete. It was expected that this charge would yield between 2000 and 3000 pounds of fat, the remainder being water and proteinaceous solids.

For 2000 pounds of fat yield a minimum of 6 pounds of the lignin silicate combination is considered necessary. Therefore about 8 pounds of ligno-silicates were added since for 3000 pounds of fat yield 9 pounds would be necessary.

It is noted, however, that the dosage could also be stepped up to a maximum of 18 pounds for 2000 pounds or 27 pounds for 3000 pounds of fat yield.

Since the processed matter in this case is raw material in the true sense of the word, that is, as received from the slaughterhouse, no exact measurement of the free fatty acid (F.F.A.) contents and odor of the initial stock is made.

However, the success of the operation was established by the fact that, in the rendered fat the F.F.A. number was not above 1.5% though this was a summer operation, and because of faster deterioration in summer, that is, release of more actic acid etc., the F.F.A. number usually is up to 2%. Likewise the Lovibond (5¼″) color was not over 10 red though normally it would exceed this number in summer.

These figures show that the process of the invention, among others, contributes to restrict the release of undesirable acid odors into the atmosphere.

Example 2

This and the following examples relates to the refinement of freshly rendered fat.

A 300 gram sample of bleachable fancy tallow as rendered had an initial F.F.A. (oleic) of 1.18% and an F.A.C. color of 17/11B.

F.A.C. refers to the color standards set up by the Fatty Acid Commission following the standards of the American Chemical Society and the American Oil Chemical Society. It will be understood that the lower the number the more desirable the color of the product.

The sample was placed in a vessel to which an amount of 2% (by weight of the sample) of a 10% aqueous solution of lignin ("Politol S") was added.

The mass was subjected to agitation to form an intimate contact.

1% (by weight of the sample) of calcium silicate in the form of the "Microcel T49" product was then added and the temperature was slowly brought up to 95° C. and maintained at this level for 10 minutes with continued agitation. Thereafter 2% of a filter aid, specifically "Celite 560" were added and agitation was continued for another 2 minutes.

The mass was finally subjected to vacuum filtration. The filtration time was 4 minutes 10 seconds. The filtered fat had the following specifications:

F.F.A. oleic—0.45%;
F.A.C. color—13+.

Example 3

The same procedure was followed as in Example 2 but the Politol solution was used in an amount of 3% and the Microcel calcium silicate in an amount of 1½%. The filtration time in this case, after addition of Celite as in Example 1, was 5 minutes and 30 seconds. The filtrate was clear. The fat obtained had the following specifications:

F.F.A. oleic—0.35%;
F.A.C. color—13

Example 4

In this example the procedure was the same as in Example 2 but the amount of Politol solution was 3% and the amount of Microcel likewise was 3%. The filtration time was 5 minutes 50 seconds. The filtrate was clear and the fat had the following specifications:

F.F.A. oleic—0.18%;
F.A.C. color—11.

As appears an increase in only the lignin solution produced somewhat better results but an increase in both the lignin solution and the calcium silicate had a substantially improved effect.

Example 5

In this example the process was again the same as in Example 2 but the lignin solution was used in an amount of 4% and Microcel, that is, the calcium silicate in an amount of 2%. The temperature was brought slowly to a slightly higher level, that is 105° C., at which level the test was discontinued because of intense foaming. The total contact time was 18 minutes. The filter aid was again added in the form of a diatomite filter, specifically, 2% Celite 560. The filtration time was 2 minutes. The filtrate was slightly cloudy. The filtered fat had the following specifications:

F.F.A.oleic—0.18%;
F.A.C. color—not darker than 11.

The refiltered fat showed a soap content (as $Na_2CO_3$) of 0.04%.

This example brings out that an increase in one of the components, the lignin with a corresponding decrease of the other component, the calcium silicate in general does not affect the improvement.

Example 6

In this example a 300 gram sample of top white tallow which had been subjected to preceding filtration was employed. In its initial condition the sample showed the following specifications:

F.F.A. oleic—1.20%;
F.A.C. color—not darker than 3.

The sample was placed in a vessel and 1 gram of insoluble lignin in the form of "Politol NA" was added together with 9 cc. of water.

Since the lignin in this case was not used in the form of an aqueous solution, separate addition of water was necessary.

The mass was agitated to form an intimate contact and 3% of calcium silicate in the form of "Microcel T49" were then added. The temperature was slowly raised to 95° C. and maintained at this level with continued agitation for 10 minutes. 2% of an inert filter aid, specifically Celite 560 were then aded and the agitation was continued for another 2 minutes. The mass was thereafter vacuum-filtered using a Whatman No. 2 (slow, fine) filter paper. The filtration time was 8 minutes. The filtrate obtained was clear. The specifications of the filtered fat were as follows:

F.F.A. oleic—0.18%;
F.A.C. color—lighter than 1.

This example illustrates the use of insoluble lignin which permits obtaining results somewhat similar to those obtainable with the water soluble form of lignin.

Example 7

In this example a 300 gram sample of bleachable fancy tallow was used which had the following specifications in its initial condition:

F.F.A. oleic—1.50%;
F.A.C. color—11A plus.

The sample was placed in a vessl together with 1% water and subjected to agitation to form intimate contact. 1% of calcium silicate in the form of the Microcel product used in the previous examples was then added and the temperature brought slowly to 85° and maintained there for 10 minutes with continuous agitation. Considerable frothing occurred. 2% of a filter aid such as "Celite 560" were then added and agitation was continued for another 2 minutes. The product was then vacuum filtered with a filtration time being 4 minutes. The filtered fat was not clear. The F.F.A. contents of the fat were 0.90%.

The fat was then subjected to further refining by bleaching it with 3% activated bleaching clay ("Super Filtrol"). The final analysis showed the following In the Lovibond color test (5¼″): 70 yellow, 8.0 red;
F.F.A. oleic: 1.2% (increase of F.F.A. due to soap presence in the filtered Microcel-treated fat).

This example shows the rather poor results when using calcium silicate alone. The example may be compared with Example 3 in which the same amount of calcium silicate was employed but with addition of 2% of an aqueous lignin solution.

Example 8

The procedure of Example 7 was repeated with the same type of sample. However 3% water were added and the calcium silicate was used in an amount of 1½%. The filtration time in this case was 16 minutes. The fat was clear and had the following specifications:

F.F.A. oleic—0.25%;
F.A.C. color—11.

The fat was then bleached with 3% Super Filtrol and thereafter showed the following results:

In the Lovibond color test (5¼"): 10 yellow, 1.0 red;
F.F.A. oleic: 0.25%.

While the F.F.A. contents and the F.A.C. color figures in this example were not too bad, the filtration time was poor.

A filtration time of 16 minutes with a small sample as in this case would amount to a filtration time of many hours, such as 10 or 12 hours, in an industrial operation. This would be entirely unacceptable for practical purposes.

Actually with a small sample any filtration time above 8 minutes indicates that some blocking up of the filter has occurred. This example therefore likewise shows that in the absence of lignin the results are poor even though an increased amount of Microcel may be used.

Example 9

In this case a filtered tallow sample in the amount of 300 gram was used with the following initial specifications:

F.F.A.—1.93%;
F.A.C. color—17.

This example likewise is for comparative purposes and shows the results without the use of lignin. The sample was placed in a vessel together with 1% water and was subjected to mechanical agitation in order to form an intimate dispersion. 3% of calcium silicate (Microcel T49) was then added and the temperature brought up slowly to 95° C. with continuous agitation. The mass was permitted to remain at that temperature for 10 minutes. 2% filter aid (Celite 560) was then added and the contact time was extended for another 2 minutes. Vacuum filtration was then effected with a filtration time of 12 minutes. The filtered product was clear. The specification of the fat was as follows:

F.F.A.—0.75%;
F.A.C. color—11.

This example shows that a still further increase of the calcium silicate amount does not substantially improve the results in the absence of lignin.

The example may be compared with Examples 3 and 6 where the same amount of calcium silicate was used, this however together with lignin and thus resulting in normal filtration.

Example 10

This example illustrates a refining operation carried out on an industrial scale.

20,000 pounds of hydrogenated tallow were received in liquid form from the catalyst press and were subjected to agitation at 200° F. for 20 minutes and upon addition of 50 pounds of ligno-magnesium silicate containing equal amounts of lignin and magnesium silicate. The fat then filtered clear with the addition of 50 pounds of an inert filter aid as described in the preceding examples.

The initial acidity dropped from 0.75 to 0.25%. The fat color was lowered from 1.5 red to 0.5 red (5¼" Lovibond). The filtration time was 1 hour at a maximum pressure of 20 pounds per square inch.

Example 11

In this example 60,000 pounds of freshly rendered beef tallow were processed. The original mass had an acidity of 1.5% F.F.A. and a color of 17 F.A.C. The mass was agitated with 300 pounds of water to which 50 pounds of lignin, and 200 pounds of calcium silicate were added. The temperature was raised slowly to 180° C. a contact time of 30 minutes. Thereafter 200 pounds of a coarse filter aid were added with a contact time of 20 minutes before the mass was passed to a filter press.

The acidity in this case had dropped to 0.25 F.F.A., the filtration time was 2 hours. The filtrate was clear, soap free and the filter cake containing the converted fatty acids was firm.

I claim:

1. In the process of improving the quality of fat obtained during rendering or refining wherein a comminuted, fat containing raw material or a proteinaceous matter containing fat are subjected, upon agitation, to the action of hot water or steam in a vessel followed by settling and filtration, the step of adding (a) lignin and (b) a calcium silicate, magnesium silicate or a mixture of these two silicates to the charge in an amount of at least 0.05% by weight of each of the additives at (a) and (b), the said percentage being relative to the weight of the anticipated yield of fat.

2. The process of claim 1 wherein the additives are employed in amounts within the range between 0.05% and 0.30% by weight for each component.

3. The process of claim 1 wherein the total amount of the components at (a) and (b) added is about 0.03% by weight.

4. The process of claim 1 wherein the lignin is added in the form of a dry purified substantially sulfur- and sugar-free lignin.

5. The process of claim 1 wherein the lignin employed is added in the form of a purified substantially sulfur- and sugar-free water soluble alkali metal salt.

6. The process of claim 1 wherein the lignin added is in the form of a ligno-phosphate.

7. The process of claim 1 wherein the silicates are employed as a mixture of calcium silicate and magnesium silicate, each being used at a minimum amount of 0.05% by weight.

8. The process of claim 7 wherein the two silicates are used in about equal amounts.

9. The process of claim 1 wherein the additives at (a) and (b) are added to the charge, the charge then being subjected to a steam treatment in a cooker for rendering the fat.

10. The process of claim 1 wherein the additives at (a) and (b) are added to a freshly rendered fat, the fat then being subjected to a heat treatment in water in order to improve its acidity and color properties.

11. The process of claim 1 wherein in addition to the additives at (a) and (b) an activated clay and a filter aid is added to the mass.

12. The process of claim 11 wherein the filter aid is subsequently added after at least part of the treatment with the additives at (a) and (b) has been carried out.

References Cited

UNITED STATES PATENTS

| | | | |
|---|---|---|---|
| 2,185,414 | 1/1940 | McKinney | 260—425 |
| 2,512,245 | 6/1950 | Fash | 260—425 |
| 2,654,766 | 10/1953 | Taussky | 260—425 |
| 3,423,442 | 1/1969 | Eichler et al. | 260—425 |

LEWIS GOTTS, Primary Examiner

J. R. BROWN, Assistant Examiner

U.S. Cl. X.R.

260—425